United States Patent [19]

Hermann et al.

[11] Patent Number: 4,537,830
[45] Date of Patent: Aug. 27, 1985

[54] THERMOPLASTIC MOLDING COMPOSITIONS OF POLYVINYLBUTYRAL CONTAINING PLASTICIZER

[75] Inventors: Hans D. Hermann, Bad Soden am Taunus; Klaus Fabian, Kriftel, both of Fed. Rep. of Germany

[73] Assignee: Hoechst Aktiengesellschaft, Fed. Rep. of Germany

[21] Appl. No.: 575,711

[22] Filed: Jan. 31, 1984

[30] Foreign Application Priority Data

Jan. 31, 1983 [DE] Fed. Rep. of Germany ....... 3303111

[51] Int. Cl.$^3$ .......................... C08L 29/14; C08K 5/10; C08K 5/52; B32B 17/10
[52] U.S. Cl. ..................................... 428/437; 156/99; 156/106; 156/309.3; 156/324.4; 524/137; 524/138; 524/139; 524/140; 524/141; 524/142; 524/144; 524/145; 524/557
[58] Field of Search .............. 524/142, 140, 137, 138, 524/139, 141, 557, 144, 145; 428/437; 156/99, 106, 309.3, 324.4

[56] References Cited

U.S. PATENT DOCUMENTS

| | | | |
|---|---|---|---|
| 3,922,456 | 11/1975 | Baldridge | 428/437 |
| 3,950,305 | 4/1976 | Schmidt | 428/437 |
| 3,998,792 | 12/1976 | Hermann et al. | 525/61 |
| 4,128,694 | 12/1978 | Fabel et al. | 428/437 |
| 4,130,684 | 12/1978 | Littell et al. | 428/437 |
| 4,144,217 | 3/1979 | Snelgrove et al. | 428/437 |
| 4,230,771 | 10/1980 | Phillips | 428/437 |
| 4,276,351 | 6/1981 | Phillips | 428/437 |
| 4,361,625 | 11/1982 | Beckmann et al. | 428/437 |
| 4,385,951 | 5/1983 | Pressau | 428/437 |

*Primary Examiner*—Herbert J. Lilling
*Attorney, Agent, or Firm*—Berman, Aisenberg & Platt

[57] ABSTRACT

Thermoplastic molding compositions comprising 65–80% by weight (based on the molding composition) of a polyvinylbutyral which preferably contains 19–28% by weight (based on the polyvinylbutyral) of vinyl alcohol units, and 35–20% by weight (based on the molding composition) of a plasticizer mixture of 50–99% by weight (based on the plasticizer mixture) of a di-, tri- or tetra-glycol diester and 50–1% by weight (based on the plasticizer mixture) of a phosphoric acid triester. The preparation of the molding compositions by mixing the constituent components and their use for the production of shaped thermoplastic articles, in particular high-strength films for use as the bonding intermediate layer in the production of laminated glass.

8 Claims, No Drawings

THERMOPLASTIC MOLDING COMPOSITIONS OF POLYVINYLBUTYRAL CONTAINING PLASTICIZER

The invention relates to thermoplastic molding compositions based on polyvinylbutyral containing plasticizer, processes for their preparation and their use for the production of shaped thermoplastic articles, in particular of high-strength films which are outstandingly suitable as a bonding intermediate layer in the production of laminated glass.

The use of plasticized polyvinylbutyral for the production of laminated glass has been known for a long time. Polyvinylbutyrals containing between about 17 and 23% by weight of vinyl alcohol units have proved preferable for this. Tri- and tetra-ethylene glycol esters of aliphatic monocarboxylic acids with 5–10 carbon atoms are particularly suitable plasticizers. They impart to the shaped articles or films a good stability at low temperatures and good mechanical properties.

Commercially available polyvinylbutyral films contain, for example, 29% by weight of a triglycol ester of aliphatic monocarboxylic acids and a polyvinylbutyral with 20–21% by weight of vinyl alcohol units.

The mechanical properties of the above polymer plasticizer mixtures can be improved still further by reducing the content of plasticizer. However, this results in problems, such as deterioration of processability and stability at low temperatures, which have not yet been solved. It is also possible to improve some properties of the polymer/plasticizer mixture by increasing the vinyl alcohol content in the polymer. The compatibility with plasticizers, however, thereby suffers.

Numerous other plasticizers are also known for polyvinylbutyral. Dihexyl adipate may be mentioned as an example. Nevertheless, this plasticizer is only sufficiently compatible with polyvinylbutyral with not more than 20% by weight of vinyl alcohol units. The strength of such polymer/plasticizer mixtures is good only with a relatively low plasticizer content. However, since the plasticizer is the component which is more readily accessible, in comparison with the polymer, it is desirable to process polymer/plasticizer mixtures with as high as possible a plasticizer content, which moreover is particularly simple in view of the increased flowability of such mixtures. As is known, the combination of phosphoric acid ester and phthalic acid ester is also a very good plasticizer system. This system still gives the polyvinylbutyral film very good mechanical properties, coupled with a good stability at low temperatures, at plasticizer concentrations of up to 35% by weight. If the plasticizer content is reduced to about 30% by weight, very strong films are obtained, but their stability at low temperatures is noticeably impaired.

According to the prior art, it is thus not possible to obtain films with exceptional mechanical properties, such as a high tear strength and high strength at 100% elongation, without the processability of the polymer/plasticizer mixture and its stability at low temperatures being impaired, the danger of incompatibility with the plasticizer furthermore also frequently arising.

It has now been found, surprisingly, that shaped articles, and in particular films of high strength, good processability and good properties at low temperatures, can be obtained from thermoplastic molding compositions based on polyvinylbutyral containing plasticizer, by producing them from a component mixture consisting of (A) 65–80% by weight, preferably 69–74% by weight, based on the component mixture, of a polyvinylbutyral which preferably contains 21–28% by weight, in particular 22 to 26% by weight, of vinyl alcohol units and (B) 35–20% by weight, preferably 31–26% by weight, based on the component mixture, of a plasticizer mixture of (a) 50–99% by weight, preferably 70–95% by weight, based on the plasticizer mixture, of a glycol ester of the formula I

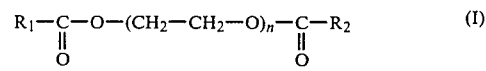

in which $R_1$ and $R_2$, which can be identical or different, denote aliphatic radicals which can be linear or branched, in each case contain 4–10 carbon atoms, are optionally additionally substituted and optionally contain double bonds, and n denotes an integer from 2 to 4, and (b) 50–1% by weight, preferably 30–5% by weight, based on the plasticizer mixture, of a phosphoric acid ester of the formula II

in which $R_3$, $R_4$ and $R_5$, which can be identical or different, denote aliphatic radicals which have in each case up to 18 carbon atoms, preferably 2–10 carbon atoms, optionally contain double bonds and/or optionally contain hetero-atoms, preferably oxygen atoms, and/or optionally contain halogen atoms and can also be substituted, and $R_4$ and/or $R_5$ can also denote cycloaliphatic, aromatic or araliphatic radicals with in each case up to 18 carbon atoms.

Surprisingly, only relatively small amounts of phosphoric acid ester of the formula II are sufficient to increase substantially the compatibility of the glycol ester of the formula I with the polyvinylbutyral (A). This is of considerable advantage, since although the phosphoric acid ester of the formula II by itself is very highly compatible with the polyvinylbutyral (A), it does not give high-strength films, i.e. films with a very high tensile strength.

In contrast, by using the plasticizer combination according to the invention, it is possible substantially to maintain and utilize the very high intramolecular forces of the polyvinylbutyral (A), so that films with exceptionally good mechanical properties and good processability can be obtained, in spite of the relatively high concentrations of plasticizer mixture. Using these films as the intermediate layer in the usual normal film thickness, glass laminates can be produced with an average breaking height which has not hitherto been achieved. In contrast, if a laminate with the average breaking height hitherto customary is required, it is on the other hand possible to manage with a significantly reduced film and/or glass thickness using polyvinylbutyral films produced according to the invention.

The invention thus relates to thermoplastic molding compositions based on polyvinylbutyral which contain plasticizer and have been prepared from the above component mixture according to the invention.

The invention furthermore relates to a process for the preparation of the claimed thermoplastic molding compositions from polyvinylbutyral containing plasticizer by intimate mixing of the above individual components to give the component mixture according to the invention, and to the use of the thermoplastic molding compositions according to the invention for the production of shaped thermoplastic articles, in particular films, and to the use of these films for the production of glass laminates.

The known di-, tri- and tetra-ethylene glycol esters of aliphatic monocarboxylic acids with 5–10 carbon atoms are preferably used as the plasticizer component of the formula I. The esters of triethylene glycol with 2-ethylbutyric acid, n-heptanoic acid, n-octanoic acid, 2-ethylhexanoic acid or a mixture of aliphatic acids with 6–9 carbon atoms are particularly preferred. The corresponding esters of tetraethylene glycol are also preferred.

The content of compounds of the formula I in the plasticizer mixture is at least 50% by weight, preferably at least 70% by weight. The upper limit of the concentration of compounds of the formula I is determined by the compatibility limit with the polyvinylbutyral. Accordingly, if the content of vinyl alcohol units in the polymer (A) is low and the plasticizer concentrations are high, it is higher than, for example, if the content of vinyl alcohol units is high. This compatibility limit, which can be adjusted as desired by varying the phosphoric acid ester component of the formula II in the plasticizer, can easily be determined by known methods.

Preferred suitable phosphoric acid esters of the formula II are esters of aliphatic straight-chain or branched alcohols, such as, for example, n-butanol, n-hexanol, 2-ethylhexanol, isodecyl alcohol, heptenol, ethylglycol or chloroethyl alcohol, and furthermore cyclohexanol. Up to two of the three ester groups can also be aromatically esterified, for example with phenol or alkylphenol. Particularly preferred phosphoric acid esters are tris-(2-ethylhexyl), octyldiphenyl, tributoxyethyl and triisodecyl phosphate.

The compatibility of the plasticizer component of the formula I with polyvinylbutyral is significantly improved with only a 1% content of phosphoric acid ester of the formula II in the plasticizer mixture. 5–30% by weight of phosphoric acid ester is preferably used in the plasticizer mixture. The total plasticizer concentration in the polymer/plasticizer mixture is in the customary range, i.e. preferably between 20 and 35% by weight (based on the total polymer/plasticizer mixture). 26–31% by weight of plasticizer mixture is particularly preferred. It has proved advantageous to use a plasticizer concentration as close as possible to the compatibility limit, but only to the extent that no danger of incompatibility can exist.

The polymers used are, in principle, polyvinylbutyrals such as are described for the production of laminated films, for example in German Pat. No. 2,732,717 and German Pat. No. 2,453,780, and also in numerous other literature sources. The defining feature is merely that the content of vinyl alcohol units in the polymer should preferably be at least 21% by weight, in particular at least 22% by weight. The upper limit of this content is preferably 28% by weight, in particular 26% by weight.

Polyvinylbutyrals containing less than 21% by weight down to 19% by weight of vinyl alcohol units can also be used in some cases. However, it should be noted here that glycol esters of the formula I which are less compatible per se with polyvinylbutyral are then preferably used, which is the case with, for example, compounds of the formula I in which $R_1$ and $R_2$ denote aliphatic radicals with in each case 8–10 carbon atoms. In such cases, the plasticizer mixture should preferably contain 10–30% by weight of phosphoric acid ester of the formula II.

The polyvinylbutyral can also additionally contain vinyl acetate units in amounts of up to 5% by weight, preferably up to 3% by weight, based on the polymer.

The molecular weight and the viscosity of the polymer are also subject to the customary limits, such as are known, for example, from German Pat. No. 2,453,780. If the content of vinyl alcohol units in the polyvinylbutyral is high, it may be advantageous to use polymers of relatively low viscosity. If the polymer contain fewer vinyl alcohol units, its viscosity can also be higher. In general, polyvinylbutyrals which have a viscosity of between 30 and 200 mPa.s (measured to DIN 53,015 at 23° C.) in 5% strength solution in ethanol are preferably used for the production of films. The melt index $i_2$, measured under a load of 2.16 kg at 190° C. according to DIN 53,735 on polymer/plasticizer mixtures, is preferably between 0.5 and 10 g/10′, in particular between 1 and 5 g/10′. The melt index $i_{10}$ under a load of 10 kg can be determined as a measure of the flow properties at 150° C. This melt index is preferably between 0.1 and 15 g/10′, in particular between 0.2 and 8 g/10′.

The polymer and plasticizer can be mixed and processed in any desired known manner. Thus, for example, it is possible to mix the polymer in powder form intensively with the liquid plasticizer in a suitable mixer and then to melt and process the mixture. Another possibility is to bring together polymer and plasticizer directly on the processing machine. The polymer/plasticizer mixture can be processed to shaped articles or films on rolls, calenders or presses. A preferred processing method is extrusion through a slot die.

The polyvinylbutyral plasticized according to the invention and the films produced therefrom can also contain the customary additives, in particular stabilizers, such as, for example, phenols, phosphoric acid esters, triazine derivatives and others, preferably in concentrations between 0.1 and 1% by weight, based on the total thermoplastic molding composition.

It is furthermore advantageous also to add to the plasticized polymer, especially if this is used as laminated glass film, those compounds which reduce the adhesion to glass, such as, for example, basic metal hydroxides and salts, especially potassium hydroxide or alkaline potassium salts, such as potassium formate and potassium acetate, and furthermore compounds having a betaine structure. These additives are preferably used in concentrations of between 0.01 and 0.2% by weight, based on the total thermoplastic molding composition.

Other additives are anti-blocking agents, optical brighteners and dyestuffs, which can be used as required in the customary concentrations.

The production of glass laminates can likewise be carried out by customary methods. For this, for example, the polyvinylbutyral film which has been plasticized according to the invention is placed between two sheets of glass 1–3 mm thick and the sheets are pressed at about 60° to 100° C. to form a prelaminate. This can then be pressed in an autoclave at 120°–160° C. to give the final laminate.

The following test methods were used in the examples to characterize the polyvinylbutyral films according to the invention and the glass laminates.

1. Determination of the strength of (DIN 53,455).

The film, which is usually 0.6 to 0.8 mm thick, is kept in a climatically controlled atmosphere at 23° C. and 50% relative atmospheric humidity for at least 3 days. The tear strength, elongation at break and strength at 100% elongation are measured under the following conditions: clamped length 50 mm, width of the measurement strip 15 mm, drawing speed 20 cm/minute.

2. Compatibility with plasticizer.

Test strips of film of the polymer/plasticizer mixture with the dimensions 100×15×0.9 mm are folded in the middle, across the longitudinal direction, and are placed between two sheets of glass such that a loop of the strip protrudes out about 5 mm between the glass sheets. The samples are then stored at 23° C. and 100% atmospheric humidity for 7 days. The exudation of the plasticizer is determined visually on the inner side of the loop by means of a magnifying glass.

3. Flexibility at low temperatures.

The modulus of shear as a function of the temperature is measured according to DIN 43,445 on the films kept under climatically controlled conditions according to point 1. The temperature at which the modulus of shear G reaches the value of $10^3$ N/mm$^2$ is determined as a measure of the stability of the films to low temperatures (=low temperature value in °C.).

4. Average breaking height of glass laminates (DIN 52,306).

Glass laminates 30×30 cm in size are produced in a known manner from two sheets of float glass 3 mm thick and a plasticized polyvinylbutyral film 0.76 mm or 0.6 mm thick. The average breaking height of the laminates is determined using a 2.26 kg steel ball, this height being the ball drop height at which 50% of the sheets tested are broken through.

The invention is described in more detail by the following examples.

EXAMPLE 1

Three samples of a polyvinylbutyral polymer containing 22.3% by weight of vinyl alcohol units were each kneaded for 10 minutes at 150° C. with the amounts of plasticizer shown in Table 1 under (a) to (c) (% by weight, based on the total polymer/plasticizer mixture). The polymer had a viscosity of 72 mPa.s, measured on a 5% strength solution in ethanol at 23° C. according to DIN 53,015.

Before the measurement, the polymer was dissolved at 70° C. The measurement was made immediately after the solution had cooled. 0.8 mm thick film were produced from each of the three mixtures (a)–(c). Testing of these films gave the following results, which are summarized in Table 1:

TABLE 1

| Plasticizer (% by weight, based on the film) | Compatible with plasticizer | Tear strength (N/mm$^2$) | Elongation at break (%) | Melt index $i_{10}$ 150° C. (g/10') | Low temperature value (°C.) |
|---|---|---|---|---|---|
| (a) 29 triethylene glycol di-n-heptanoate (3G7) (= comparison) | no | 27.5 | 325 | 5.8 | −50 |
| (b) 29 3G7/tri-2-ethylhexyl phosphate (TOF), weight ratio 9:1 | yes | 27.0 | 330 | 5.7 | −52 |
| (c) 31 3G7/TOF, weight ratio 9:1 | yes | 25.0 | 355 | 8.0 | −55 |

Table 1 shows that the film (b) produced according to the invention, with a good compatibility with plasticizers, has the same favorable properties as the comparison film (a), which, however, is not sufficiently compatible with the plasticizer. In contrast, film (c) with its higher amount of plasticizer according to the invention is perfectly compatible. Besides having a very good stability at low temperatures, films (b) and (c) also have strengths which entirely correspond to the requirements of the prior art.

EXAMPLE 2

A (Comparison samples)

Films 0.8 mm thick were produced from a plasticized polyvinylbutyral containing 23.2% by weight of vinyl alcohol units as in Example 1. In each case 29% by weight of plasticizer (based on the total polymer/plasticizer mixture) were used, and in particular, the di-esters of triethylene glycol and the following acids were used in samples (a) to (c):

(a) n-heptanoic acid (3G7)
(b) 2-ethylbutyric acid (3GH)
(c) a mixture of (C$_6$–C$_9$)-carboxylic acids (3G6-9), and in sample (d) the tetraethylene glycol diester of n-heptanoic acid (4G7).

None of films (a) to (d) passed the plasticizer compatibility test.

B (Samples according to the invention)

If in each case 15% by weight of the 29% by weight of the plasticizers (a)–(d) used in samples A were replaced, according to the invention, by trioctyl phosphate, in all cases perfect compatibility with the plasticizer was achieved, without the strength of the films or their flow properties thereby being impaired.

EXAMPLE 3

30% by weight of 3GH, based on the total polymer/plasticizer mixture, are no longer compatible with a polyvinylbutyral containing 24.2% by weight of vinyl alcohol units. However, a film 0.76 mm thick produced from this mixture has a high tear strength of 30.5 N/mm$^2$ at a melt index $i_{10}$ 150° C. of 1.8 g/10'. In an experimental series, according to the invention the 30% by weight of 3GH was now replaced by 30% by weight of a plasticizer combination containing in each case 8 parts by weight of 3GH and 2 parts by weight of various phosphoric acid esters, the phosphoric acid esters of the formula II shown in Table 2 under (e) to (g) being used. As the result summarized in Table 2 shows, the film samples (e) to (g) plasticized according to the invention have both a good compatibility with the plasticizer and an outstanding tear strength, besides a very favorable melt index $i_{10}$ 150° C.

diester of 2-ethylhexanoic acid (=3G8) and trioctyl phosphate (=TOF).

TABLE 3

| Film from | Vinyl alcohol units in the polyvinylbutyral component (% by weight) | Plasticizer component (% by weight, based on the film) | Compatible with the plasticizer | Melt index $i_2$ 190° C. (g/10') | Tear strength (N/mm$^2$) | Elongation at break (%) | Strength at 100% elongation (N/mm$^2$) | Low temperature value (°C.) |
|---|---|---|---|---|---|---|---|---|
| Experiment C | 24.2 | 29 3G7/TOF, weight ratio 8:2 | yes | 2.9 | 32.0 | 320 | 6.5 | −49 |
| Comparison 1 | 21.2 | 29.5 3GH | yes | 1.4 | 26.0 | 295 | 4.3 | −49 |
| Comparison 2 | 20.7 | 31 dihexyl phthalate/TOF, weight ratio 8:2 | yes | 4.4 | 28.5 | 310 | 3.8 | −39 |
| Experiment D | 20.5 | 29 3G8/TOF, weight ratio 8:2 | yes | 5.4 | 29.0 | 310 | 4.5 | −51 |

TABLE 2

| Plasticizer component of the formula II | Compatible with the plasticizer | Tear strength (N/mm$^2$) | Melt index $i_{10}$ 150° C. (g/10') |
|---|---|---|---|
| (e) trioctyl phosphate (TOF) | yes | 30.5 | 1.9 |
| (f) trichloroethyl phosphate | yes | 31.5 | 1.4 |
| (g) tributoxyethyl phosphate | yes | 31.0 | 1.1 |

EXAMPLE 4

A polyvinylbutyral containing 22.6% by weight of vinyl alcohol units and having a viscosity of 60 mPa.s (measured as described in Example 1) was mixed with 27.5% by weight (based on the total polymer/plasticizer mixture) of a plasticizer combination of 90% by weight of 3GH and 10% by weight of TOF and the mixture was extruded to a film 0.6 mm thick. The film contained 0.03% by weight, based on the film, of potassium formate as an anti-adhesive agent. The film had the following properties: tear strength 31.0 N/mm$^2$, elongation at break 295%, strength at 100% elongation 5.4 N/mm$^2$, melt index $i_{10}$ 150° C.=2.7 g/10', no exudation of the plasticizer. A laminate produced with this film from two sheets of 3 mm float glass had an average breaking height of 5.50 m.

EXAMPLE 5

A plasticized polyvinylbutyral film produced according to the invention by extrusion (=experiment C) was compared with a commercial product (=comparison 1). A film which contained a mixture of phosphoric acid ester and phthalic acid ester as the plasticizer system was used as a further comparison product (=comparison 2). The experimental results are summarized in Table 3. They show the advantageous strength properties of the film according to the invention from experiment C, and the better low temperature value of the latter as against the film from comparison 2.

Experiment D comprises a plasticized polyvinylbutyral film produced according to the invention by extrusion, the polyvinylbutyral component of which consists of 20.5% by weight of vinyl alcohol units and the plasticizer system of which consists of the triethylene glycol

EXAMPLE 6

A polyvinylbutyral containing 26.0% by weight of vinyl alcohol units was kneaded in a Brabender kneader for 10 minutes at 150° C. with in each 28% by weight (based on the total polymer/plasticizer mixture) of the plasticizer mixtures (a) to (d) listed in Table 4. The test results are summarized in Table 4, showing the high strength, the good flow properties and the good plasticizer compatibility of the polyvinylbutyral/plasticizer mixtures (a) to (d) according to the invention.

TABLE 4

| Plasticizer mixtures | Compatible with the plasticizer | Melt index $i_2$ 190° C. (g/10') | Tear strength of the 0.8 mm film (N/mm$^2$) |
|---|---|---|---|
| 3GH/TOF, weight ratio 6:4 | yes | 2.3 | 32.0 |
| (b) 3GH/trichloroethyl phosphate, weight ratio 6:4 | yes | 2.7 | 34.0 |
| (c) 3GH/diphenyloctyl phosphate, weight ratio 6:4 | yes | 1.9 | 33.5 |
| (d) 3GH/tributoxyethyl phosphate, weight ratio 6:4 | yes | 2.4 | 37.5 @ |

EXAMPLE 7

A film 0.76 mm thick was produced by extrusion from a polyvinylbutyral with a viscosity of 81 mPa.s (measured as described in Example 1) and 23.6% by weight of vinyl alcohol units, and 29% by weight (based on the total polymer/plasticizer mixture) of a plasticizer mixture of 3G7 TOF, weight ratio 8:2. The adhesion of the film to glass was adjusted by adding 0.04% by weight of a compound having a betaine structure, of the formula

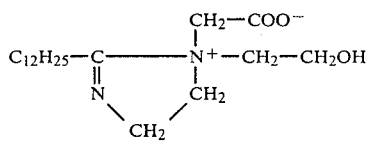

and 0.04% by weight (in each case based on the total polymer/plasticizer mixture) of potassium formate to the polymer/plasticizer mixture. The resulting film had the following properties: melt index $i_2$ 190° C.=3.4 g/10', tear strength 31.5 N/mm², elongation at break 315%, strength at 100% elongation 6.3 N/mm², low temperature value −49° C.

Glass laminates prepared with this film from two sheets of float glass 3 mm thick had an average breaking height of 7.80 m. Parallel to this, laminates were produced using the same float glass under the same conditions with a commercially available 0.76 mm thick film. These laminates had an average breaking height of only 6.40 m.

We claim:

1. A thermoplastic molding composition based on polyvinylbutyral containing plasticizer, comprising a component mixture of
   (A) 65-80% by weight, based on the component mixture, of a polyvinylbutyral containing vinyl alcohol units and
   (B) 35-20% by weight, based on the component mixture, of a plasticizer mixture of
      (a) 50-99% by weight, based on the plasticizer mixture, of a glycol ester of formula I

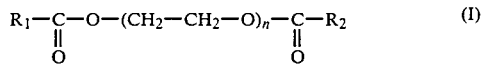

in which $R_1$ and $R_2$, which can be identical or different, denote aliphatic radicals with in each case 4-10 carbon atoms and n denotes an integer from 2 to 4, and
      (b) 50-1% by weight, based on the plasticizer mixture, of a phosphoric acid ester of formula II

in which $R_3$, $R_4$ and $R_5$, which can be identical or different, denote aliphatic radicals which have in each case up to 18 carbon atoms, optionally contain double bonds and/or optionally contain hetero-atoms and/or optionally contain halogen atoms and can also be substituted, and $R_4$ and/or $R_5$ can also denote cycloaliphatic, aromatic or araliphatic radicals with in each case up to 18 carbon atoms.

2. A thermoplastic molding composition as claimed in claim 1, wherein component A comprises a polyvinylbutyral containing 19-28% by weight of vinyl alcohol units.

3. A thermoplastic molding composition according to claim 1, which comprises 74-69% by weight of a polyvinylbutyral containing 22-26% by weight of vinyl alcohol units and 26-31% by weight of component mixture B, consisting of 70-95% by weight of component (Ba) and 30-5% by weight of component (Bb), based on the component mixture B.

4. A shaped polyvinylbutyral article produced from a thermoplastic molding composition as claimed in claim 1.

5. A polyvinylbutyral film of high strength produced from a thermoplastic film molding composition as claimed in claim 1.

6. A glass laminate containing a polyvinylbutyral film as claimed in claim 5 as the bonding layer.

7. In a method for producing a glass laminate which comprises pressing a plastic film between two sheets of glass, the improvement wherein the plastic is a polyvinylbutyral film as claimed in claim 5.

8. A high strength polyvinylbutyral film of a thermoplastic composition which consists essentially of (A) polyvinylbutyral containing vinyl alcohol units and (B) a plasticizer mixture,
   wherein the film comprises from 65 to 80% by weight of (A) and the remaining 35 to 20% by weight of (B),
   wherein from 50 to 99% by weight of (B) is glycol ester of formula I:

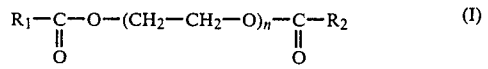

in which
      each of $R_1$ and $R_2$ is, independently, an aliphatic radical with from 4 to 10 carbon atoms and
      n is 2, 3 or 4, and
   wherein the remaining 50 to 1% by weight of (B) is phosphoric acid ester of formula II:

in which
      $R_3$ is an aliphatic radical with up to 18 carbon atoms and which optionally contains one or more (a) double bonds, (b) hetero atoms, (c) halogen atoms and/or (d) other substituents, and
      each of $R_4$ and $R_5$ is, independently, one of the meanings of $R_3$, a cycloaliphatic radical, an aromatic radical or an araliphatic radical, in each case with up to 18 carbon atoms.

* * * * *